Figure 1:
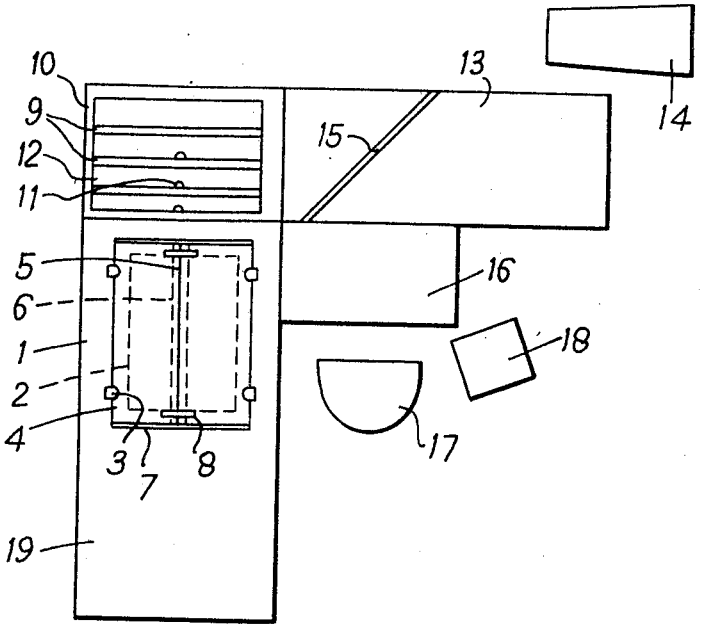
Figure 2:
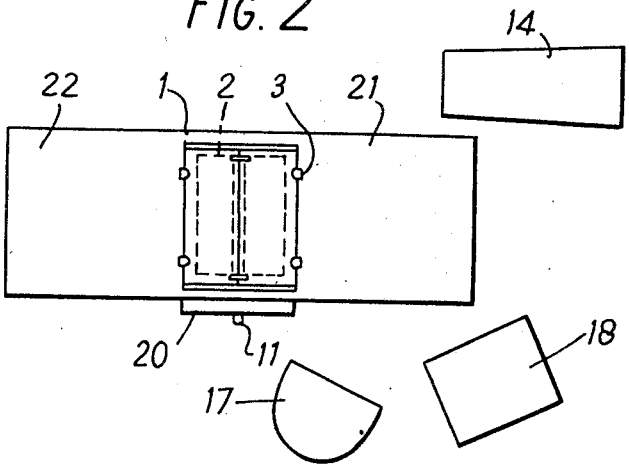

DEFENSIVE PUBLICATION

UNITED STATES PATENT AND TRADEMARK OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent and Trademark Office makes no assertion as to the novelty of the disclosed subject matter.

PUBLISHED APRIL 6, 1976

945 O.G. 31

T945,010

CARRIER-BAG PACKING UNIT

Henry Charles Deards, Welwyn, England, assignor to Imperial Chemical Industries Limited, London, England

Filed Feb. 28, 1975, Ser. No. 554,223
Claims priority, application Great Britain, Mar. 12, 1974, 10,897/74
Int. Cl. B65h *1/00*
U.S. Cl. 221—63
2 Sheets Drawing. 11 Pages Specification

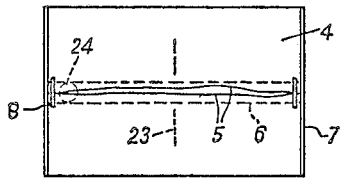

A packing unit for packing goods in carrier bags of flexible sheet material, such as low density polyethylene as described in U.S. Pat. No. 3,834,528, including a generally horizontal surface upon which successive bags may be positioned for loading and an assembly of bags from which the bags may be drawn singly for loading, the bags hang from a support located adjacent to an edge of the loading surface. The bags are generally suspended in relation to the loading surface at a height such that at least three quarters of the length of the bags hangs below the panels of the edge of the loading surface; the bags back panels facing towards the surface. The bags are suspended from a pin which, in respect to each bag, passes between the folds at the inner edges of the two front panels thereof and through an aperture in the back panel thereof which is spaced inwardly from an edge seam of the bag, the bags being suspended with at least their lower edges hanging below the level of the edge of the surface.

The loading surface preferably includes a platform upon which an empty bag is initially laid, the platform being equipped with means for lowering it from its initial position, including clamps adjacent to the platform in its initial position for releasably holding the side folds of the bag.

The unit is particularly adapted for use at supermarket check-out stations, or in shops where a number of packages are placed in a basket, bag or other container for removal by the customer.

FIG. 3
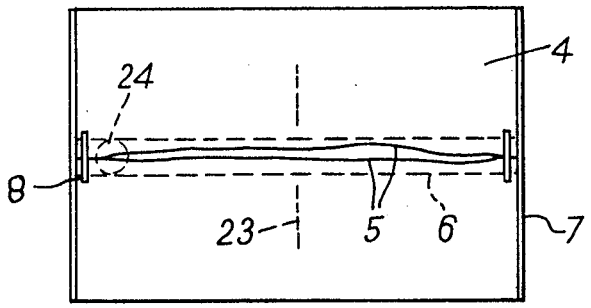
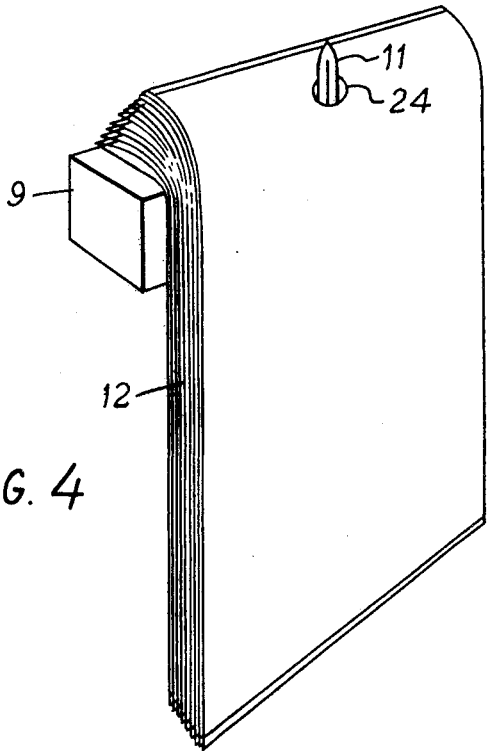
FIG. 4